J. H. STALEY.
WORKMAN'S STAND FOR GAS ENGINES.
APPLICATION FILED NOV. 20, 1917.
1,283,588.
Patented Nov. 5, 1918.
2 SHEETS—SHEET 1.
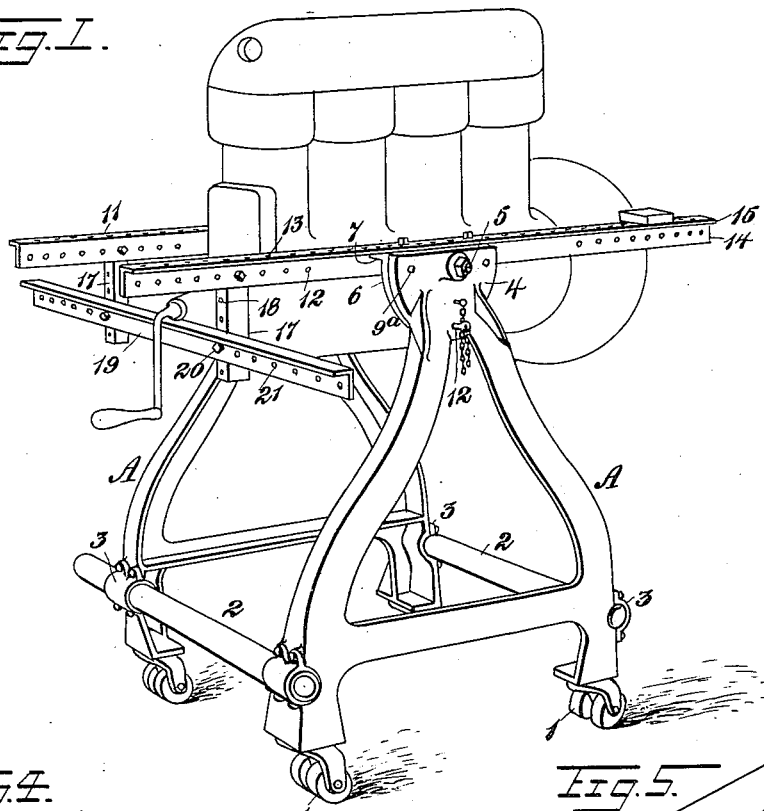
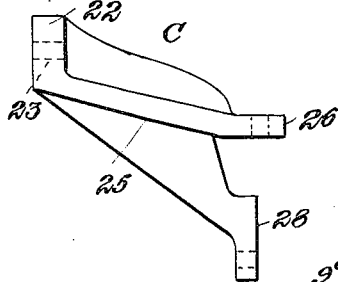
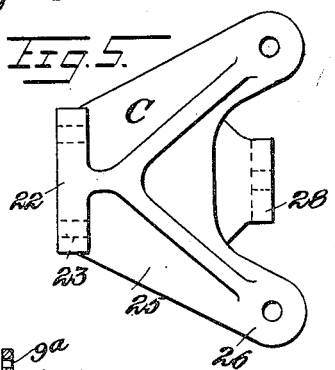
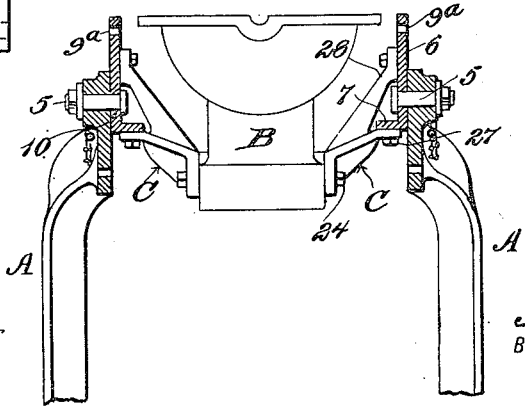
WITNESSES
H. J. Walker
C. Bradway.
INVENTOR
J. H. Staley.
BY
ATTORNEYS

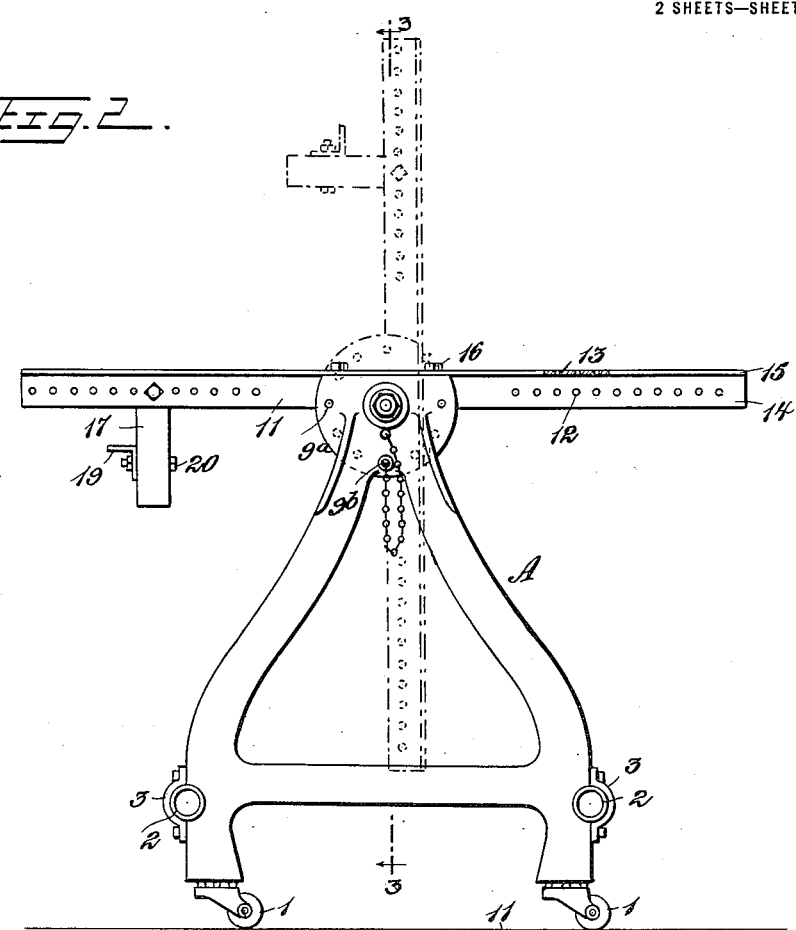
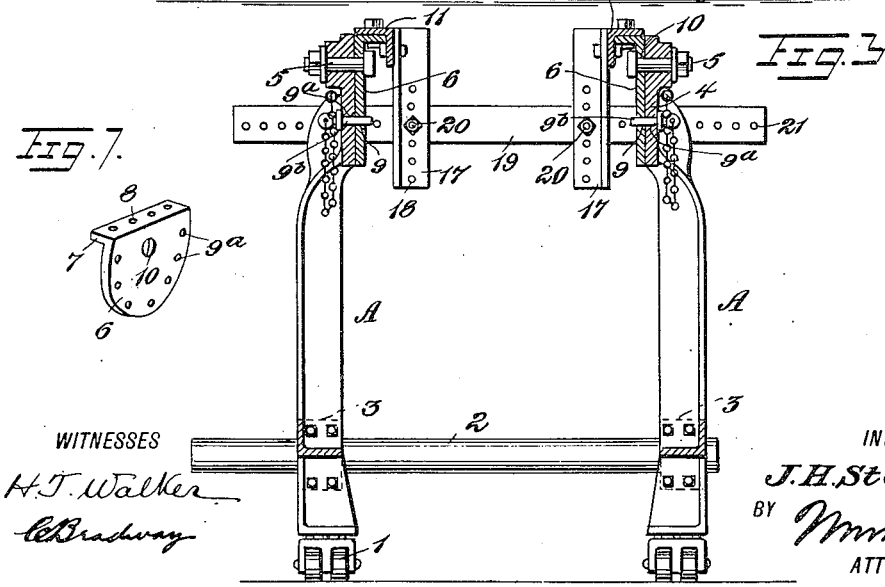

UNITED STATES PATENT OFFICE.

JOSEPH H. STALEY, OF KNIGHTSTOWN, INDIANA.

WORKMAN'S STAND FOR GAS-ENGINES.

1,283,588.　　　　Specification of Letters Patent.　　Patented Nov. 5, 1918.

Application filed November 20, 1917.　Serial No. 202,977.

*To all whom it may concern:*

Be it known that I, JOSEPH H. STALEY, a citizen of the United States, and a resident of Knightstown, in the county of Henry and State of Indiana, have invented a new and Improved Workman's Stand for Gas-Engines, of which the following is a full, clear, and exact description.

This invention relates to a stand designed for use in workshops or manufacturing plants for the purpose of supporting an internal combustion engine or other motor in a manner to enable the workman to operate on it in a most convenient manner.

The invention has for its general objects to improve the construction of stands of this character so as to be reliable and efficient in use, comparatively simple and inexpensive to manufacture, and so designed that they can be capable of holding various types of engines in such a manner that the engine can be completely reversed or turned upside down.

A more specific object of the invention is the provision of a universal motor stand having a novel arrangement of supporting bars, brackets or the like mounted on turn plates which can be locked in any desired position to hold the engine in a horizontal, vertical or any intermediate position.

With such objects in view, and others which will appear as the description proceeds, the invention comprises various novel features of constuction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a perspective view of the stand, showing a motor supported thereon;

Fig. 2 is a side view showing the supporting bars in horizontal position by full lines and in vertical position by dotted lines;

Fig. 3 is a vertical section on the line 3—3, Fig. 2;

Fig. 4 is a side view of a bracket used in connection with the stand for supporting a Ford engine thereon;

Fig. 5 is a plan view of the bracket shown in Fig. 4;

Fig. 6 is a vertical section showing the use of the brackets; and

Fig. 7 is a perspective view of one of the turn plates.

Referring to the drawing, the stand comprises a pair of side frames A which are provided with caster rollers 1 so as to easily move over the floor, the frames being connected by horizontal rods or pipe sections 2 which are clamped by couplings 3 with the edges of the frames A. By loosening the couplings the frames A can be moved toward or from each other so as to change the width of the stand to suit different size motors. Each frame A has at its top a hub or plate 4 through which passes a pivot bolt 5 that supports a turn plate 6 of approximately semi-circular form, as shown in Fig. 7. Each turn plate 6 has a lateral flange 7 which has bolt openings 8, and in the body of the plate are openings 9 concentric with the pivot opening 10. In the hub 4 are openings 9$^a$ which are arranged to register with the openings 9 of the turn plate so that by means of a pin 9$^b$ inserted through any of the openings 9$^a$ and engaging in any of the openings 9, the turn plate 6 can be locked from turning. The flanges 7 serve to enable an engine to be directly bolted to the turn plates, by which latter the engine can be supported in upright, inverted or any angular position according to the work to be done by the workmen.

The pivotally mounted plate 6 may be employed for holding supporting bars 11 which are preferably angle strips with a plurality of bolt-receiving apertures 12 and 13 in the flanges 14 and 15. The flanges 15 overlap the flanges 7 of the turn plates 6 and are fastened thereto by bolts 16. An engine can be supported on the bars 11 in a variety of ways and by any suitable means. In connection with the supporting bars 11 may be employed hangers 17 which are short angle irons having bolt-receiving apertures 18, and to these hangers is clamped a cross angle bar 19 adjustably secured in place by bolts 20 which pass through apertures 21 and 18. Any suitable means may be employed for clamping the engine to the swinging frame or cradle formed by the turn plates 6, side bars 11, hangers 17 and cross bar 19.

When a Ford engine or the cylinder casting is to be mounted in the stand, brackets such as that shown in Figs. 4 and 5 are employed in the manner shown in Fig. 6, wherein B is a cylinder casting and C are the supporting brackets. Each bracket is formed with a flat vertical portion 22 having bolt apertures 23 for receiving the studs 24 that hold the water manifolds of the engine in place. The web or body 25 of the bracket C has horizontally extending apertured lugs 26 which are fastened by bolts 27 to lateral flanges 7 of the pivoted carrier plates 6, and also each bracket C has a central apertured lug 28 which is bolted to the lateral face of the turn plate 6. In this manner the engine or cylinder casting is held between the turn plate 6 in a convenient position for work thereon.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A motor stand comprising a pair of frames, vertically disposed turn plates, horizontal pivots passing through the frames and turn plates, each turn plate having a laterally extending flange provided with spaced apertures, means in addition to the pivots for locking the said plates in different positions of adjustment, and angle bars detachably fastened to the flanges of the turn plates and extending transversely to the pivots.

2. A motor stand comprising a pair of frames, vertically disposed turn plates pivotally mounted on the frames and having laterally extending apertured flanges, a pin engageable in any of the apertures of a plate, means on the frame with which the pin is engageable for locking the said plates in different positions of adjustment, and angle supporting bars adjustably fastened to the flanges of the turn plates and having a plurality of bolt-receiving apertures whereby an engine can be fastened to the said bars, said angle bars extending transversely to the pivotal axis of the turn plates.

3. A motor stand comprising a pair of frames, vertically disposed turn plates pivotally mounted on the frames and having laterally extending apertured flanges, means for locking the said plates in different positions of adjustment, angle supporting bars adjustably fastened to the flanges of the turn plates and having a plurality of bolt-receiving apertures, hangers adjustably mounted on the bars, and a cross bar adjustably mounted on the hangers.

4. A motor stand comprising a pair of frames, turn plates pivotally mounted on the frames with their pivotal axes coinciding, an engine-supporting bar attached to each turn plate and extending transversely to the pivot thereof, and bars extending transversely to the first-mentioned bar and adjustably connected with each frame, whereby the stand can be varied in width from one turn plate to the other.

JOSEPH H. STALEY.

Witnesses:
 MINNIE L. STALEY,
 CHARITY E. SIMMONS.